United States Patent [19]

Malkamaki et al.

[11] Patent Number: 5,577,024
[45] Date of Patent: Nov. 19, 1996

[54] MULTIPLE ACCESS RADIO SYSTEM

[75] Inventors: Esa Malkamaki, Espoo; Harri Jokinen, Hiisi, both of Finland

[73] Assignee: Nokia Mobile Phones Ltd., Salo, Finland

[21] Appl. No.: 543,690

[22] Filed: Oct. 16, 1995

Related U.S. Application Data

[63] Continuation of Ser. No. 247,355, May 23, 1994, abandoned.

[30] Foreign Application Priority Data

Jul. 8, 1993 [FI] Finland ..................... 933129

[51] Int. Cl.⁶ .......................... H04B 7/26; H04J 4/00
[52] U.S. Cl. ............................ 370/18; 370/50; 370/95.3
[58] Field of Search ..................... 370/18, 50, 85.2, 370/95.1, 95.3; 375/200, 203, 205

[56] References Cited

U.S. PATENT DOCUMENTS

| | | | |
|---|---|---|---|
| 3,789,149 | 1/1974 | Clark | 370/18 |
| 4,301,530 | 11/1981 | Gutleber | 370/18 |
| 4,754,453 | 6/1988 | Eizenhofer | 370/95.1 |
| 4,799,252 | 1/1989 | Eizenhoffer et al. | 379/59 |
| 4,882,579 | 11/1989 | Siwiak | 340/825.44 |
| 5,012,469 | 4/1991 | Sardana | 370/95.3 |
| 5,103,459 | 4/1992 | Gilhousen et al. | 375/205 |
| 5,170,412 | 12/1992 | Massey | 375/206 |
| 5,241,542 | 8/1993 | Natarajan et al. | 370/95.3 |
| 5,327,432 | 7/1994 | Zein Al Abedeen et al. | 370/95.3 |
| 5,412,659 | 5/1995 | Fujita et al. | 370/95.3 |

FOREIGN PATENT DOCUMENTS

| | | | |
|---|---|---|---|
| 76523/87 | 2/1982 | Australia . | |
| 0286383 | 10/1988 | European Pat. Off. | H04L 1/16 |
| WO93/07693 | 4/1993 | WIPO | H04J 13/00 |
| WO93/15573 | 8/1993 | WIPO | H04J 13/00 |

OTHER PUBLICATIONS

Finnish Office Action dated 25 May 1994 on Finnish Priority Application No. 933129 and English translation thereof.
Generalized Complementary Code Sets, B. Schweitzer, 1972, pp. 1–86.
Digital Communications Fundamentals and Applications, Sklar, B., Prentice Hall, Englewood Cliffs, New Jersey, Chapters 9–10, 1988.
"Contention-Based Reservation Protocol Using a TDD Channel for Wireless Local Area Networks: A Performance Analysis", T. Suzuki et al., IEEE In't. Conf on Communications '93, May 23–26, 1993.

*Primary Examiner*—Melvin Marcelo
*Attorney, Agent, or Firm*—Perman & Green

[57] ABSTRACT

The invention relates to a communication method for a digital cellular mobile telephone system and a digital cellular mobile telephone system comprising several base stations and mobiles utilizing time division multiple access. In the system communication is carried out on a predetermined frequency band in a predetermined number of time slots having a predetermined length. In the communication between the mobiles and the base station within the TDMA time slot with the predetermined length, the transmissions to communicate information comprising a few bits or several bits from the mobiles communicating with the same base station at least within the same time slot are mutually substantially orthogonal. Preferably, in order to communicate information, preferably information of the on-off type, such as acknowledgments and channel allocation requests, the mobiles communicating with the same base station use substantially orthogonal transmissions at least to the same base station in the same time slot. Preferably each mobile transmits within the TDMA burst of said TDMA time slot of the predetermined length as a part of the burst a predetermined bit sequence corresponding to the transmitted information bit combination, whereby the predetermined frequency band is unchanged. The bit sequences transmitted by different mobiles to the same base station are mutually substantially orthogonal. By using such substantially orthogonal transmissions it is possible to avoid collisions between the communications of information comprising a few or several bits, typically 1 to 10 bits, such as acknowledgments and channel allocation requests, which typically occur in a time division multiple access system.

25 Claims, 1 Drawing Sheet

MULTIPLE ACCESS RADIO SYSTEM

This is a continuation of application(s) Ser. No. 8/247,355 filed on May 23, 1993, now abandoned, which designated the U.S.

BACKGROUND OF THE INVENTION

The present invention relates to a multiple access system for transmitting and/or receiving radio signals.

Many telecommunication applications require message acknowledgment. For instance, the GSM system requires that a data packet formed for transmission is transmitted as several bursts, which are de-interleaved and channel decoded at reception. Then the whole received data packet is searched for errors. If the data packet contains errors, then information about this is sent to the transmitting equipment, which then re-transmits the whole data packet. Message acknowledgment is typically information of the on-off type, in other words, the acknowledgment receiver must only know whether its message was correctly received or not, and act correspondingly. Such situations occur often e.g. in connection with automatic re-transmission (ARQ, Automatic Repeat reQuest), whereby the receiving end informs the transmitting end whether the message was correctly received or not. This is called acknowledgment. If re-transmissions occur seldom, it is generally preferred to send so called negative acknowledgments, or only unsuccessful transmissions are acknowledged, whereby the acknowledgment always represents a request for re-transmission. In this way it is possible to save capacity of the return channel or acknowledgment channel.

When the said ARQ method is used in a multiple access environment, where several users use the same transmission medium, the users' transmissions are distinguished by known methods, e.g. time, frequency or code division techniques. In the same way we try to classify the acknowledgments. If each user sends the acknowledgments rather infrequently, it is does not pay to reserve separate acknowledgment capacity for each, but several users can share a certain "acknowledgment channel". However, then it is possible that more than two users will try to acknowledge at the same time, using the same "acknowledgment channel". Typically all simultaneous acknowledgments are lost when a collision occurs.

An example of the application of re-transmission is presented in the Finnish Patent application FI-924943, which uses fast re-transmission when transmitting speech data or other data which is delay critical, and in which a burst or a part of it is re-transmitted during the time slot used by the speech encoder to generate a new speech frame, whereby the re-transmission does not create any extra delay. A radio telephone system like this requires an acknowledgment channel, in which the receiver can request (the request is automatic) fast re-transmission. In a system where data is transmitted in both directions the acknowledgment can use the normal transmission burst/time slot of the opposite direction. In a system where data is transmitted in one direction only, whereby we talk about a discontinuous transmission (DTX) or utilize e.g. the silent moments in the speech and thus free capacity for other users, we need a separate acknowledgment channel for the re-transmission requests. The re-transmission requests from the base station to the mobiles (the down-link communication direction) may be combined and as several requests transmitted et the same time in one time slot/burst. A problem will be the transmission of acknowledgments from the mobile to the base station (the up-link communication direction). A defined time slot for the acknowledgment transmission can be reserved for each user, but this means wasted capacity, if the re-transmission requests are infrequent. On the other hand, said collisions will occur, if several users are allowed to use the same time slot for the acknowledgments.

As an example, let us discuss the TDMA system, which has 140 time slots in each TDMA frame. Let 100 of these 100 time slots be reserved for normal transmissions, 20 for re-transmissions and 20 for acknowledgments. Thus 100 users can use the same carrier simultaneously. Let as an average 15 to 20% of the bursts request (acknowledge) and re-transmit, whereby on the average 20 time slots for the re-transmissions and 20 time slots for the acknowledgments is sufficient. Acknowledgment from the mobiles to the base station the (up-link direction) is more problematic than the reverse direction, because the mobiles cannot mutually coordinate their transmissions, but several mobiles may try to acknowledge in the same time slot which creates a collision.

The Finnish Patent application FI-925472 presents a communication method and system having as the object to increase the number of users in a network or a cell. Data is transmitted using a combined CDMA/DMA or TDMA/CDMA multiple access, whereby complementary code sets (perfectly orthogonal codes) are used as spreading codes in the CDMA. When the method is applied in operating or planned TDMA systems a CDMA section is included, with which a CDMA multiple access spreading codes as above are used to increase the number of users. The presented method does not require power saving methods or multiple access interference suppression methods to increase the capacity. However, such a communication method and system as such is not suitable to be used in a conventional TDMA system in order to avoid on-off type information collisions, such as collisions of message acknowledgment and channel allocation information, when it is desired to keep the same frequency band, because the CDMA multiple access method broadens the frequency band (spectrum).

SUMMARY OF THE INVENTION

In accordance with a first aspect of the invention there is provided a multiple access system for transmitting and/or receiving radio signals in respective ones of a predetermined number of mutually distinguishable channels adapted to allow access to one of said predetermined number of channels to a sole concurrent user and to allow access to another of said predetermined number of channels to plural concurrent users on respective mutually distinguishable subchannels.

The invention provides the advantage that signals that are transmitted relatively infrequently and are short relative to the bandwidth of a transmission channel can be transmitted in mutually distinguishable subchannels. This reduces the likelihood of collisions between these infrequently transmitted signals which typically are provided with fewer transmission channels because of their infrequency of use.

In accordance with a second aspect of the invention there is provided a communication method for a digital cellular mobile telephone system comprising several base stations and mobiles utilizing time division multiple access, whereby the communication is carried out on a predetermined frequency band in a predetermined number of time slots having a predetermined length, characterized in that in the communication between the mobiles and the base station within said TDMA time slot with the predetermined length, mutually substantially orthogonal transmissions are used to transmit information comprising a few bits or several bits from the mobiles communicating with the same base station at least within the same time slot.

The second aspect of the present invention provides a' communication method for a digital cellular mobile telephone system and a digital cellular mobile telephone system, with which in a TDMA system it is possible to transmit information such as acknowledgments and channel allocation information from a mobile to a base station, which information is preferably of the on-off type having the length of a few or several bits, typically 1 to 10 (or more) bits, without information loss caused by collisions. This Is solved so that the mobiles use substantially orthogonal signals for acknowledgments, whereby the collisions are avoided or it is possible to recover from them. A "collision" here means that two or more users transmit their bursts in the same TDMA time slot. Using normal TDMA bursts usually results in the loss of both bursts, if the other burst is not clearly stronger, so that it can be successfully received (so called capture effect). According to this aspect of the invention collisions are either avoided or it is possible to recover from them, in other words, they do not cause problems when orthogonal transmissions are used. The transmissions can be made orthogonal, either in frequency or in time so that collisions are avoided. Another alternative to arrange orthogonal transmissions is to use substantially orthogonal bit sequences and a code access technique, whereby the bursts do "collide" if they are transmitted in the same time slot or so that they are received as overlapping bursts, but because the signals are orthogonal they can be detected, whereby the system recovers from the "collision", in other words, both messages are received.

When the infrequently transmitted information is one bit each user of the same time slot can be provided with a defined bit sequence, which the user transmits or receives when desired (e.g. acknowledgment). This may be signaling of the on-off keying (OOK) type, or the bit "1" (=acknowledgment) may correspond to a bit sequence transmission and the bit "0" is not transmitted at all. The acknowledgment can be either positive or negative, depending on the system.

A positive acknowledgment means that a message is incorrectly received and requested to be re-transmitted. When a one bit sequence is used to transmit a positive acknowledgment of the OOK type, a negative acknowledgment is not transmitted at all, and correspondingly, when a bit sequence is used for a negative acknowledgment or re-transmission request, then no positive acknowledgment is sent at all. Alternatively we could reserve a bit sequence for both acknowledgments, whereby we always send either sequence. When we use substantially orthogonal signals for different mobiles, e.g. by using different bit sequences, we can allow several mobiles to use the same TDMA time slot for these substantially orthogonal transmissions.

The transmitted information may comprise a predetermined bit sequence which corresponds to the transmitted information bit combination, whereby the predetermined frequency band is unchanged and whereby the predetermined bit sequences are substantially orthogonal at least within the same time slot and between the mobiles communication with the same base station.

Each TDMA time slot of the predetermined length may be divided into a predetermined number of shorter time slots, and that within one shorter time slot at most a predetermined number of mobiles may communicate with the same base station.

Each TDMA time slot of the predetermined length may alternatively be divided into a predetermined number of shorter time slots, and that within one shorter time slot only one mobile may communicate with the same base station.

The information may comprise information of the on-off type and may be a message acknowledgment or a channel allocation request to the base station from a mobile. The mobiles preferably transmit transmissions which are orthogonal at least with respect to other mobiles transmitting to the same base station in the same time slot. The base station preferably transmits to several mobiles said information comprising a few or several bits as orthogonal transmissions in the same time slot. The information will have a typical length of 1 to 10 bits.

In accordance with a third aspect of the invention there is provided a digital transmitter for a time division multiple access system to transmit time divided signals, characterized in that it comprises means to generate a bit sequence of a predetermined length to be transmitted as a part of a burst in the TDMA time slot in order to communicate information having a length of 1 to 10 bits.

In accordance with a fourth aspect of the invention there is provided a digital receiver for a time division multiple access system to receive time divided signals, characterized in that it comprises at least one correlator to correlate several different bit sequences in order to detect the transmitted information having a length of 1 to 10 bits.

BRIEF DESCRIPTION OF THE DRAWINGS

The invention is described below in more detail with reference to the enclosed drawings, in which.

DETAILED DESCRIPTION OF THE PREFERRED EMBODIMENT

Figure 1:
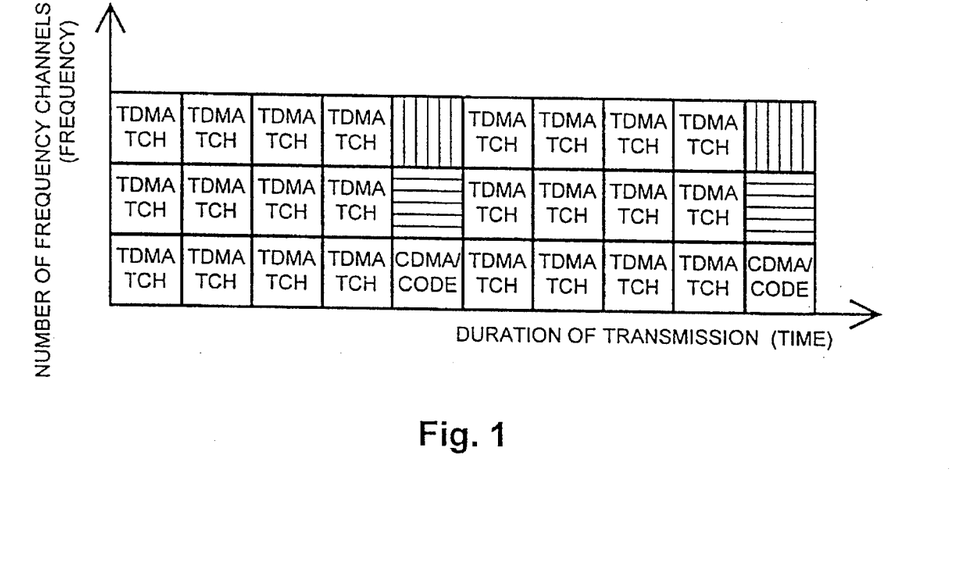
FIG. 1 shows methods according to the invention to make certain orthogonal transmissions in the TDMA system.

FIG. 1 shows different principles according to the invention in order to make certain transmissions orthogonal, whereby the horizontal axis represents the time division principle according to TDMA, the vertical axis represents the TDMA frequency channels, and the squares represent transmission of a TDMA time slot. TCH represents the traffic channel. One simple way to provide orthogonal transmissions from the mobiles, the transmissions comprising messages with a length of a few or several bits, is thus to divide certain time slots (e.g. the acknowledgment time slots) into smaller parts and allocate to each mobile such a smaller time slot, which here is called a mini time slot. This is shown in FIG. 1 on the top horizontal row (the vertical lines in the fifth and the tenth square), in which a TDMA time slot is divided into smaller time slots for said transmissions. In the example case of the TDMA system with 140 time slots referred to above, this would mean that in order to detect each acknowledgment transmitted in such a mini time slot 20 acknowledgment time slots would have to be divided into five parts, so that we get a total of 100 mini time slots. It is possible to arrange e.g. the base station to measure the power in the respective mini time slot. However, this would mean an unnecessary high possibility for erroneous alarms, because the power threshold could be exceeded also due to an interfering transmission.

A guard time is also required between the mini time slots, so that one TDMA time slot cannot be divided into very many parts, otherwise the whole time slot would be occupied by guard times.

One further alternative is to arrange that the acknowledgments are orthogonal also in frequency, or only in frequency, i.e. so that each mobile is allocated a defined frequency which it uses to transmit the acknowledgment in the acknowledgment time slot. This is shown In FIG. 1 on the middle horizontal row (the horizontal lines in the fifth and tenth square), in which the frequency channel of one TDMA time slot is divided into several narrower frequency bands.

The most preferred way to realize the orthogonality is to use a defined known bit sequence (shown in FIG. 1 by the reference CDMA/CODE), which the base station looks for by e.g. correlating, and which in the TDMA burst represents certain information, with a length of typically 1 to 10 bits, and preferably comprising information of the on-off type, such as acknowledgment and channel allocation. Different mobiles have different bit sequences, on the basis of which the base station identifies the mobile which transmitted the acknowledgment/message. Then the acknowledgment/message can be identified as transmitted, when the correlation result exceeds a certain threshold value. A defined bit sequence can be allocated to a defined mobile so that when the mobile moves into the area of a base station, then the base station, when creating the link between the base station and the mobile, gives the mobile a defined bit sequence in order to realize transmissions according to the invention.

When the bit sequences are used to transmit information with a few bits, then for every transmitted information bit combination we must reserve a separate transmit bit sequence. If we for instance transmit 3 bits of information, then we need 8 different bit sequences. These sequences must be substantially orthogonal with respect to the bit sequences transmitted by other users in the same time slot.

Still another alternative to obtain the orthogonality of acknowledgment and corresponding information transmissions is to use code division techniques, whereby each mobile has its own spreading code which it would use in the acknowledgment time slot. This is shown in FIG. 1 on the bottom row by the reference CDMA/CODE. The use of the CDMA method in this context means that a few bits (typically 1 to 10) of information is spread over the whole burst (alternatively over a part of the burst), so that we keep the same bit rate transmitted over the channel, i.e. the signal bandwidth is not changed. If we for instance have to transmit 4 bits of information and a TDMA time slot can contain 100 bits, then we can use the spreading ratio 25, whereby 100 bits (or "chips", as is generally used in CDMA) are used on the channel to transmit 4 information bits. Correspondingly we can use a spreading code with the spreading ratio 50 to transmit 2 bits of information, which again results in transmitting 100 bits on the channel. If we would use the same code as we used above to transmit the 4 bits, then we would arrive at 50 bits (spreading ratio 25), which would be transmitted in the middle of the TDMA time slot. Thus it is essential that the channel bit rate is not changed, whereby the bandwidth is kept unchanged and we can use the same transmitter and receiver. When one bit of information is transmitted, this bit is spread so that it has the length of the burst, i.e. 100 bits in the above example. Then the spreading ratio of the code is 100. In practice this corresponds to the use of the bit sequence described above. In a corresponding way as we used the CDMA method to distinguish certain transmissions in the TDMA system, we can more preferably use different bit sequences or also a kind of a code, but the difference regarding the use of CDMA is that the CDMA broadens the TDMA frequency band, but the use of shorter bit sequences does not broaden the frequency band, and thus it is preferred to use such a bit sequence. Further, using such a bit sequence we can still keep the same bit rate and ZIP rate of the TDMA system.

In the above mentioned cases the base station can be arranged to identify said information, such as an acknowledgment, typically 1 to 10 bits long, based on the fact in which mini time slot the transmission was received and/or either by receiving a signal of a certain frequency (frequency division) or by receiving a certain code (code division). The object of this invention, the transmission of information containing a few or several bits, could be any combination of the above techniques: mini time slots, bit sequence, frequency division, spreading code division (CDMA).

In the case of the example presented earlier above, when frequency division is used in the TDMA system acknowledgments each acknowledgment time slot should be able to acknowledge five users, whereby the user acknowledgments can be made orthogonal by grouping the users into 20 acknowledgment time slots and in each time slot on five different frequencies. It is also possible to enable each user to use two different time slots for the acknowledgments, whereby 10 frequencies are required in each time slot; or to use four different time slots, whereby 20 different frequencies are required, and so on. The maximum case would require 100 different frequencies, so that each could use all time slots. In the corresponding way the acknowledgments in the TDMA system can be made orthogonal for 100 code access users by dividing the users into 20 time slots and having five different codes in each time slot, whereby 10 different codes are required, and so on. The maximum case would require 100 different codes, so that all users could use all time slots. The time slots could further be divided into mini time slots using different codes or frequencies, but this would not necessary result in essentially increased advantage. (In the extreme case the signals would be orthogonal in time, and no different frequencies or codes would be required, compare to the case orthogonal in time discussed above.)

Because only 15 to 20% of the users transmit an acknowledgment it would not be necessary to group acknowledgments from different users to be fully orthogonal using only one method (100 mini time slots, 100 different frequencies or 100 different codes). According to the invention the most preferred alternative for the TDMA system should be to allow the transmission of information such as acknowledgment with a length of a few or several bits in a defined time slot (or mini time slot, if division into smaller time slot is also used) and to give each user acknowledging in the respective (mini) time slot its own bit sequence which the respective equipment transmits as an acknowledgment, whereby the base station correlates the received (mini) time slot and determines whether the respective bit sequence was transmitted, and on this basis it will know which equipment transmitted the information (acknowledgment), so that the best alternative should be to use only the said bit sequence, or to use it in combination with mini time slots.

A corresponding technique can be use also for channel allocation, e.g. with PRMA (Packet Reservation Multiple Access). There a mobile requiring a channel transmits an access burst to the base station, either in any free time slot or in a time slot reserved for access. Then the information transmitted by the mobile is typically only the user number, from which the base station knows which of the mobiles desires to transmit speech/data. Traditionally this access request is like a normal TDMA burst containing a training sequence and the user number in channel encoded form. When two or more users try to access the channel simultaneously there occurs a collision, in which usually both access bursts are lost. According to the invention it is possible to give each user a defined bit sequence (the sequences are mutually orthogonal), which it transmits when it desires to access a channel. When now a "collision" occurs (two or more users try to access simultaneously), in the best case all accesses are passed. The required number of bit sequences is lower than the number of users, if the users are divided in time to use different access time slots. It is also possible to use another above presented method to obtain the orthogonality (division into mini time slots, allocation of different frequencies), but in this channel access case they are not very probable (there is no use to reserve for each use its own mini time slot which is very seldom used).

The presented method could be used also to access a channel in which according to present specifications a "random access" burst is transmitted, which comprises a training sequence and a random number selected by the mobile and provided with error correction (e.g. the RACH In GSM) and some bits of information about the use of the channel. If two or more mobiles try to access the channel simultaneously there will be a collision. It is possible to change the specification so that the mobile transmits a defined bit sequence, whereby in the best case all accesses are passed when several mobiles transmit simultaneously. The bit sequence can be randomly selected from a bit sequence set, and different bit sequence sets may be provided for different channel uses. The bit sequences are substantially orthogonal.

In the embodiments according to the invention we can either select an own bit sequence for each bit combination or use methods known from the code access method in order to spread a few bits of information over the whole interval of a burst. The bit sequence can be like the training sequences known in TDMA methods, whereby we use a bit sequence (reference part) having good periodic autocorrelation properties. The bit sequence comprises two or three parts so that it contains the reference part and one or two additional parts. The additional parts are formed so that a part of the sequence is repeated at both ends or only at one end of the reference part. E.g. the PN sequence or sequences having nearly perfect autocorrelation properties are such sequences (presented in the publication "Almost Perfect Autocorrelation Sequences", J. Wolfmann, IEEE Trans. on Information Theory, Vol. 38, No. 4, Jul. 1992). Possible sequences are also the training sequences of GSM, but however, they may be too short for this purpose. With this we obtain the advantage that the autocorrelation properties are retained also in a multi-path channel which causes mutual interference between the bits. The used bit sequences should also have good cross-correlation properties, or they should be as orthogonal as possible, whereby the cross-correlation should be almost zero. Perfect orthogonality is not required.

Figure 2:
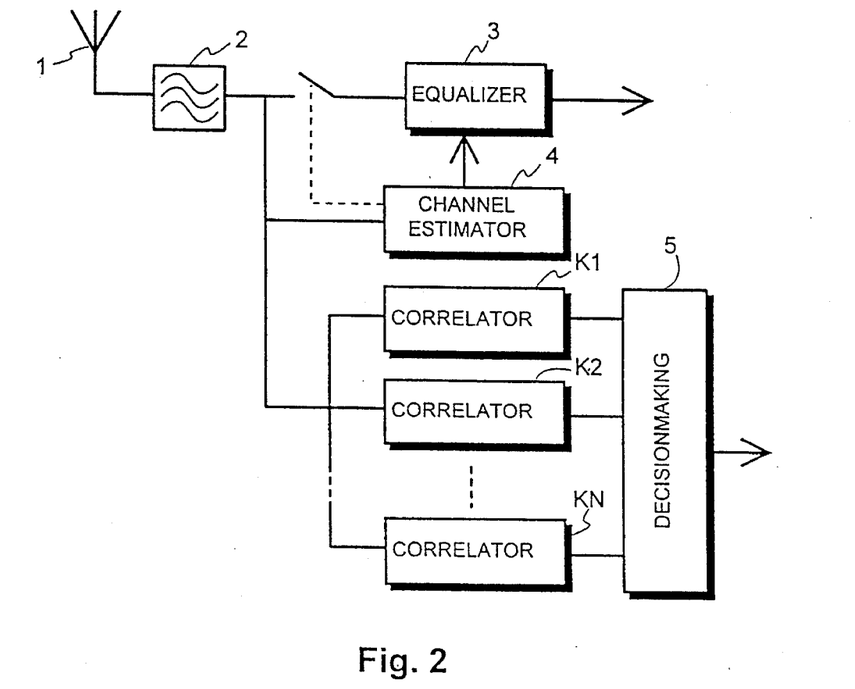
FIG. 2 shows a solution to realize the receiver in order to realize the method according to the invention.

The use of bit sequences according to the invention in order to obtain orthogonality is advantageous, because it does not require any substantial changes in the transmitter/receiver. The transmitter could be exactly the same as used in the TDMA system without the method according to the invention; the only change in its function is caused by the use of mini time slots, whereby the transmitter is switched on a shorter time as in the case of a normal burst. In the transmitter the modulator as an input receives the burst containing the desired bit sequence instead of the normal burst. The only change in the receiver compared to the receiver of a normal TDMA system receiver is the realization of the correlator, or the receiver must contain means to receive and identify the different bit sequences according to the invention. The TDMA receiver typically contains a correlator, which is used for estimation and synchronization of the channel. A conventional correlator (=channel estimator) of a TDMA receiver can with small changes be converted to the means required to realize the invention, or the correlator must receive more bit sequences to be correlated, and possibly a different correlation length. Usually the correlator is located as a part of the equalizer in front of the equalizer itself. It is also possible to use parallel correlators to correlate different sequences, or the received sequences can be correlated several times in the same correlator. The channel estimator can also be used in the correlation so that instead of correlating the training sequence we correlate bit sequences according to the invention. An example of the use of parallel correlators is illustrated in FIG. 2 showing a simplified block diagram of a part of a conventional receiver, e.g. corresponding to a GSM receiver, where an antenna 1 is connected to the duplex filter 2 having in the outgoing receiving branch in parallel with the equalizer 3 and channel estimator 4 several correlators K1–KN, the outputs of which are supplied to the decision block 5 in order to detect the received information. Compared to a conventional receiver FIG. 2 contains the new blocks K1–KN and the block 5.

When we use the code access technique to obtain the orthogonality, small changes are required both in the transmitter and the receiver. The changes can be realized digitally in the baseband, whereby it is not necessary to double the RF parts. The information containing a few bits is spread with a spreading code and the obtained bit sequence is supplied to the modulator (thus we do not need any further training sequences or the like). In the receiver we can use receiver solutions known in the CDMA technique. We can for example use interference cancellation. However, because we keep the same signal bandwidth as in normal TDMA time slots there is no need to change the RF sections of the receiver, If we use different frequencies to obtain the orthogonality, then we need more changes; they would, however, also be quite simple. The basic idea is that acknowledgements/channel allocations on different frequencies in the same time slot are narrow banded and thus they will fit within one TDMA frequency channel (for example, the 200 kHz band according to GSM could be divided into eight acknowledgment channels of 25 kHz). Then the acknowledgment can be a one frequency signal (a sine wave of a defined frequency), or a modulated narrow band signal. Then the transmitter must contain a separate modulator for acknowledgements/channel allocations which can generate signals of the mentioned type; and in a similar way the receiver must contain separate receiving means or selective filters to differentiate the signals of different frequencies. However, the disadvantage of using different frequencies is a frequency selective fading, which may cause the loss of a certain narrow band signal.

With the method and system according to the invention we can, without information loss caused by collisions, transmit from a mobile to a base station certain information comprising a few bits or several bits, typically 1 to 10 bits. The invention is not restricted to the examples presented here, but it can be applied in different ways within the limits of the knowledge of a person skilled in the art and within the scope of the enclosed claims. The invention relates to a TDMA system, but corresponding orthogonal transmissions could also be used in an FDMA system (Frequency Division Multiple Access) or a CDMA system (Code Division Multiple Access),

What is claimed is:

1. A radio communications system, comprising:

at least one central transceiver comprising means for transmitting information over a radio channel and for receiving information over the radio channel; and a plurality of user transceivers each comprising means for transmitting information over the radio channel and for receiving information over the radio channel, the information being transmitted by each of said plurality of user transceivers in a bit serial digital format;

wherein said transmitting means of at least said plurality of user transceivers utilize the radio channel for transmission as a time division, multiple access radio channel characterized by a plurality of recurring frames, each of said frames comprising a plurality of equal length slots having a duration that is selected for enabling up to n bits of data to be transmitted to the central transceiver from a user transceiver;

wherein each user transceiver further comprises means for receiving a pre-assignment of an individual one of a plurality of first slots for conveying communications traffic information;

wherein said transmitting means of said plurality of user transceivers transmit a message to said central transceiver during at least one second slot, the transmitted message comprising up to m bits of data, where m<n;

wherein said transmitting means of multiple ones of said user transceivers transmit the message during said at least one second slot, a and wherein said at least one second slot is comprised of a plurality of mutually orthogonal sub-slots.

2. A radio communications system comprising:

at least one central transceiver comprising means for transmitting information over a radio channel and for receiving information over the radio channel; and a plurality of user transceivers each comprising means for transmitting information over the radio channel and for receiving information over the radio channel, the information being transmitted by each of said plurality of user transceivers in a bit serial digital format;

wherein said transmitting means of at least said plurality of user transceivers utilize the radio channel for transmission as a time division, multiple access radio channel characterized by a plurality of recurring frames, each of said frames comprising a plurality of equal length slots having a duration that is selected for enabling up to n bits of data to be transmitted to the central transceiver from a user transceiver;

wherein each user transceiver further comprises means for receiving a pre-assignment of an individual one of a plurality of first slots for conveying communications traffic information;

wherein said transmitting means of said plurality of user transceivers transmit a message to said central transceiver during at least one second slot, the transmitted message comprising up to m bits of data, where m<n;

wherein said transmitting means of multiple ones of said user transceivers transmit the message during said at least one second slot, and wherein said messages are acknowledgement messages generated by a user transceiver and transmitted by said transmitting means in response to receiving communications traffic information from said radio channel.

3. A radio communications system as set forth in claim 2, wherein said messages further comprise channel allocation request messages generated by a user transceiver and transmitted by said transmitting means in response to the user transceiver seeking to establish communications with said central transceiver.

4. A radio communications system as set forth in claim 2, wherein m is equal to $1 \leq m \leq 10$.

5. A radio communications system comprising:

at least one central transceiver comprising means for transmitting information over a radio channel and for receiving information over the radio channel; and a plurality of user transceivers each comprising means for transmitting information over the radio channel and for receiving information over the radio channel, the information being transmitted by each of said plurality of user transceivers in a bit serial digital format;

wherein said transmitting means of at least said plurality of user transceivers utilize the radio channel for transmission as a time division, multiple access radio channel characterized by a plurality of recurring frames, each of said frames comprising a plurality of equal length slots having a duration that is selected for enabling up to n bits of data to be transmitted to the central transceiver from a user transceiver;

wherein each user transceiver further comprises means for receiving a pre-assignment of an individual one of a plurality of first slots for conveying communications traffic information;

wherein said transmitting means of said plurality of user transceivers transmit a message to said central transceiver during at least one second slot, the transmitted message comprising up to m bits of data, where m<n;

wherein said transmitting means of multiple ones of said user transceivers transmit the message during said at least one second slot, and wherein said messages are acknowledgement messages generated by a user transceiver and transmitted by said transmitting means in response to an error that occurs while receiving communications traffic information from said radio channel.

6. A radio communications system comprising:

at least one central transceiver comprising means for transmitting information over a radio channel and for receiving information over the radio channel; and a plurality of user transceivers each comprising means for transmitting information over the radio channel and for receiving information over the radio channel, the information being transmitted by each of said plurality of user transceivers in a bit serial digital format;

wherein said transmitting means of at least said plurality of user transceivers utilize the radio channel for transmission as a time division, multiple access radio channel characterized by a plurality of recurring frames, each of said frames comprising a plurality of equal length slots having a duration that is selected for enabling up to n bits of data to be transmitted to the central transceiver from a user transceiver;

wherein each user transceiver further comprises means for receiving a pre-assignment of an individual one of a plurality of first slots for conveying communications traffic information;

wherein said transmitting means of said plurality of user transceivers transmit a message to said central transceiver during at least one second slot, the transmitted message comprising up to m bits of data, where m<n;

wherein said transmitting means of multiple ones of said user transceivers transmit the message during said at least one second slot, wherein said messages are acknowledgement messages generated by a user transceiver and transmitted by said transmitting means in response to receiving communications traffic information from said radio channel, and wherein said at least one second slot is temporally divided into a plurality of sub-slots.

7. A radio communications system as set forth in claim 6, wherein said at least one second slot is not pre-assigned to any of said plurality of user transceivers.

8. A radio communications system as set forth in claim 6, wherein said central transceiver is a base station of a digital cellular communications system, and wherein at least some of said plurality of user transceivers are mobile radiotelephones.

9. A radio communications system comprising:

at least one central transceiver comprising means for transmitting information over a radio channel and for receiving information over the radio channel; and a plurality of user transceivers each comprising means for transmitting information over the radio channel and for receiving information over the radio channel, the information being transmitted by each of said plurality of user transceivers in a bit serial digital format;

wherein said transmitting means of at least said plurality of user transceivers utilize the radio channel for transmission as a time division, multiple access radio channel characterized by a plurality of recurring frames, each of said frames comprising a plurality of equal length slots having a duration that is selected for enabling up to n bits of data to be transmitted to the central transceiver from a user transceiver;

wherein each user transceiver further comprises means for receiving a pre-assignment of an individual one of a plurality of first slots for conveying communications traffic information;

wherein said transmitting means of said plurality of user transceivers transmit a message to said central transceiver during at least one second slot, the transmitted message comprising up to m bits of data, where m<n;

wherein said transmitting means of multiple ones of said user transceivers transmit the message during said at least one second slot, and wherein said at least one second slot is frequency divided into a plurality of sub-slots.

10. A radio communications system comprising:

at least one central transceiver comprising means for transmitting information over a radio channel and for receiving information over the radio channel; and a plurality of user transceivers each comprising means for transmitting information over the radio channel and for receiving information over the radio channel, the information being transmitted by each of said plurality of user transceivers in a bit serial digital format;

wherein said transmitting means of at least said plurality of user transceivers utilize the radio channel for transmission as a time division, multiple access radio channel characterized by a plurality of recurring frames, each of said frames comprising a plurality of equal length slots having a duration that is selected for enabling up to n bits of data to be transmitted to the central transceiver from a user transceiver;

wherein each user transceiver further comprises means for receiving a pre-assignment of an individual one of a plurality of first slots for conveying communications traffic information;

wherein said transmitting means of said plurality of user transceivers transmit a message to said central transceiver during at least one second slot, the transmitted message comprising up to m bits of data, where m<n;

wherein said transmitting means of multiple ones of said user transceivers transmit the message during said at least one second slot, and wherein said at least one second slot is code divided into a plurality of sub-slots.

11. A radio communications system comprising:

at least one central transceiver comprising means for transmitting information over a radio channel and for receiving information over the radio channel; and a plurality of user transceivers each comprising means for transmitting information over the radio channel and for receiving information over the radio channel, the information being transmitted by each of said plurality of user transceivers in a bit serial digital format;

wherein said transmitting means of at least said plurality of user transceivers utilize the radio channel for transmission as a time division, multiple access radio channel characterized by a plurality of recurring frames, each of said frames comprising a plurality of equal length slots having a duration that is selected for enabling up to n bits of data to be transmitted to the central transceiver from a user transceiver;

wherein each user transceiver further comprises means for receiving a pre-assignment of an individual one of a plurality of first slots for conveying communications traffic information;

wherein said transmitting means of said plurality of user transceivers transmit a message to said central transceiver during at least one second slot, the transmitted message comprising up to m bits of data, where m<n;

wherein said transmitting means of multiple ones of said user transceivers transmit the message during said at least one second slot, and wherein said at least one second slot is divided into a plurality of sub-slots by a bit sequence that is assigned to individual ones of user transceivers to transmit during said at least one second slot, each of said assigned bit sequences being one of mutually orthogonal and substantially orthogonal to other assigned bit sequences.

12. A radio communications system comprising:

at least one central transceiver comprising means for transmitting information over a radio channel and for receiving information over the radio channel; and a plurality of user transceivers each comprising means for transmitting information over the radio channel and for receiving information over the radio channel, the information being transmitted by each of said plurality of user transceivers in a bit serial digital format;

wherein said transmitting means of at least said plurality of user transceivers utilize the radio channel for transmission as a time division, multiple access radio channel characterized by a plurality of recurring frames, each of said frames comprising a plurality of equal length slots having a duration that is selected for enabling up to n bits of data to be transmitted to the central transceiver from a user transceiver;

wherein each user transceiver further comprises means for receiving a pre-assignment of an individual one of a plurality of first slots for conveying communications traffic information;

wherein said transmitting means of said plurality of user transceivers transmit a message to said central transceiver during at least one second slot, the transmitted message comprising up to m bits of data, where m<n;

wherein said transmitting means of multiple ones of said user transceivers transmit the message during said at least one second slot, and wherein said at least one second slot is divided into a plurality of sub-slots by a spreading code that is assigned to individual ones of user transceivers to transmit during said at least one second slot, each of said assigned spreading codes being one of mutually orthogonal and substantially orthogonal to other assigned spreading codes.

13. A radio communications system comprising:

at least one central transceiver comprising means for transmitting information over a radio channel and for receiving information over the radio channel; and a plurality of user transceivers each comprising means for transmitting information over the radio channel and for receiving information over the radio channel, the information being transmitted by each of said plurality of user transceivers in a bit serial digital format;

wherein said transmitting means of at least said plurality of user transceivers utilize the radio channel for transmission as a time division, multiple access radio channel characterized by a plurality of recurring frames, each of said frames comprising a plurality of equal length slots having a duration that is selected for enabling up to n bits of data to be transmitted to the central transceiver from a user transceiver;

wherein each user transceiver further comprises means for receiving a pre-assignment of an individual one of a plurality of first slots for conveying communications traffic information;

wherein said transmitting means of said plurality of user transceivers transmit a message to said central transceiver during at least one second slot, the transmitted message comprising up to m bits of data, where m<n;

wherein said transmitting means of multiple ones of said user transceivers transmit the message during said at least one second slot, and wherein said transmitting means of each of said user transceivers transmits a radio signal with a first bandwidth during an assigned one of said first time slots, and transmits a radio signal with a second bandwidth during said at least one second slot, and wherein said second bandwidth is narrower than said first bandwidth.

14. A radio communications system comprising:

at least one central transceiver comprising means for transmitting information over a radio channel and for receiving information over the radio channel; and a plurality of user transceivers each comprising means for transmitting information over the radio channel and for receiving information over the radio channel, the information being transmitted by each of said plurality of user transceivers in a bit serial digital format;

wherein said transmitting means of at least said plurality of user transceivers utilize the radio channel for transmission as a time division, multiple access radio channel characterized by a plurality of recurring frames, each of said frames comprising a plurality of equal length slots having a duration that is selected for enabling up to n bits of data to be transmitted to the central transceiver from a user transceiver;

wherein each user transceiver further comprises means for receiving a pre-assignment of an individual one of a plurality of first slots for conveying communications traffic information;

wherein said transmitting means of said plurality of user transceivers transmit a message to said central transceiver during at least one second slot, the transmitted message comprising up to m bits of data, where m<n;

wherein said transmitting means of multiple ones of said user transceivers transmit the message during said at least one second slot, and wherein said central transceiver is comprised of a receiver; an equalizer means having input coupled to an output of said receiver for equalizing a transmission received from a user transceiver during one of said plurality of first time slots; and a plurality of correlator means individual ones of which have an input coupled said output of said receiver for simultaneously detecting a plurality of messages received from a plurality of user transceivers during said at least one second time slot.

15. A radio communications system, comprising:

at least one base station comprising means for transmitting information over a first radio channel and for receiving information over a second radio channel; and a plurality of user transceivers each comprising means for transmitting information over the second radio channel and for receiving information over the first radio channel, the information being transmitted by each of said plurality of user transceivers in a bit serial digital format;

wherein at least said second radio channel is a time division, multiple access radio channel characterized by a plurality of recurring frames, each of said frames comprising a plurality of equal length slots having a duration that is selected for enabling up to n bits of data to be transmitted to the base station from said transmitting means of a user transceiver;

wherein each user transceiver further comprises means for receiving a pre-assignment of an individual one of a plurality of first slots for conveying communications traffic information;

wherein said frame is comprised at least one second slot that is not pre-assigned to any of said plurality of user transceivers;

wherein said transmitting means of said plurality of user transceivers transmit a channel allocation request message to said base station during said at least one second slot, the transmitted channel allocation request message comprising up to m bits of data, where m<n;

wherein said transmitting means of multiple ones of said user transceivers transmit a channel allocation request message during said at least one second slot; and wherein said transmitting means of one of said user transceivers transmits over the second radio channel, during a second slot, an acknowledgement message to the central transceiver in response to one of said user transceiver receiving communications traffic information from the first radio channel and said user transceiver detecting an error that occurs while receiving communications traffic information from the first radio channel.

16. A radio communications system comprising:

at least one base station comprising means for transmitting information over a first radio channel and for receiving information over a second radio channel; and a plurality of user transceivers each comprising means for transmitting information over the second radio channel and for receiving information over the first radio channel, the information being transmitted by each of said plurality of user transceivers in a bit serial digital format;

wherein at least said second radio channel is a time division, multiple access radio channel characterized by a plurality of recurring frames, each of said frames comprising a plurality of equal length slots having a duration that is selected for enabling up to n bits of data to be transmitted to the base station from said transmitting means of a user transceiver;

wherein each user transceiver further comprises means for receiving a pre-assignment of an individual one of a plurality of first slots for conveying communications traffic information;

wherein said frame is comprised at least one second slot that is not pre-assigned to any of said plurality of user transceivers;

wherein said transmitting means of said plurality of user transceivers transmit a channel allocation request message to said base station during said at least one second slot, the transmitted channel allocation request message comprising up to m bits of data, where m<n, said transmitting means of said plurality of user transceivers also transmitting acknowledgement messages during said at least one second slot in response to receiving communications traffic information from said first radio channel;

and wherein said transmitting means of multiple ones of said user transceivers transmit a channel allocation request message during said at least one second slot, wherein said at least one second slot is temporally divided into a plurality of sub-slots.

17. A radio communications system as set forth in claim 16, wherein m is equal to $1 \leq m \leq 10$.

18. A radio communications system comprising:

at least one base station comprising means for transmitting information over a first radio channel and for receiving information over a second radio channel; and a plurality of user transceivers each comprising means for transmitting information over the second radio channel and for receiving information over the first radio channel, the information being transmitted by each of said plurality of user transceivers in a bit serial digital format;

wherein at least said second radio channel is a time division, multiple access radio channel characterized by a plurality of recurring frames, each of said frames comprising a plurality of equal length slots having a duration that is selected for enabling up to n bits of data to be transmitted to the base station from said transmitting means of a user transceiver;

wherein each user transceiver further comprises means for receiving a pre-assignment of an individual one of a plurality of first slots for conveying communications traffic information;

wherein said frame is comprised at least one second slot that is not pre-assigned to any of said plurality of user transceivers;

wherein said transmitting means of said plurality of user transceivers transmit a channel allocation request message to said base station during said at least one second slot, the transmitted channel allocation request message comprising up to m bits of data, where m<n;

and wherein said transmitting means of multiple ones of said user transceivers transmit a channel allocation request message during said at least one second slot, wherein said at least one second slot is frequency divided into a plurality of sub-slots.

19. A radio communications system comprising:

at least one base station comprising means for transmitting information over a first radio channel and for receiving information over a second radio channel; and a plurality of user transceivers each comprising means for transmitting information over the second radio channel and for receiving information over the first radio channel, the information being transmitted by each of said plurality of user transceivers in a bit serial digital format;

wherein at least said second radio channel is a time division, multiple access radio channel characterized by a plurality of recurring frames, each of said frames comprising a plurality of equal length slots having a duration that is selected for enabling up to n bits of data to be transmitted to the base station from said transmitting means of a user transceiver;

wherein each user transceiver further comprises means for receiving a pre-assignment of an individual one of a plurality of first slots for conveying communications traffic information;

wherein said frame is comprised at least one second slot that is not pre-assigned to any of said plurality of user transceivers;

wherein said transmitting means of said plurality of user transceivers transmit a channel allocation request message to said base station during said at least one second slot, the transmitted channel allocation request message comprising up to m bits of data, where m<n;

and wherein said transmitting means of multiple ones of said user transceivers transmit a channel allocation request message during said at least one second slot, wherein said at least one second slot is code divided into a plurality of sub-slots.

20. A radio communications system comprising:

at least one base station comprising means for transmitting information over a first radio channel and for receiving information over a second radio channel; and a plurality of user transceivers each comprising means for transmitting information over the second radio channel and for receiving information over the first radio channel, the information being transmitted by each of said plurality of user transceivers in a bit serial digital format;

wherein at least said second radio channel is a time division, multiple access radio channel characterized by a plurality of recurring frames, each of said frames comprising a plurality of equal length slots having a duration that is selected for enabling up to n bits of data to be transmitted to the base station from said transmitting means of a user transceiver;

wherein each user transceiver further comprises means for receiving a pre-assignment of an individual one of a plurality of first slots for conveying communications traffic information;

wherein said frame is comprised at least one second slot that is not pre-assigned to any of said plurality of user transceivers;

wherein said transmitting means of said plurality of user transceivers transmit a channel allocation request message to said base station during said at least one second slot, the transmitted channel allocation request message comprising up to m bits of data, where m<n;

and wherein said transmitting means of multiple ones of said user transceivers transmit a channel allocation request message during said at least one second slot, wherein said at least one second slot is divided into a plurality of sub-slots by a bit sequence that is assigned to individual ones of user transceivers to transmit during said at least one second slot, each of said assigned bit sequences being one of mutually orthogonal and substantially orthogonal to other assigned bit sequences.

21. A radio communications system comprising:

at least one base station comprising means for transmitting information over a first radio channel and for receiving information over a second radio channel; and a plurality of user transceivers each comprising means for transmitting information over the second radio channel and for receiving information over the first radio channel, the information being transmitted by each of said plurality of user transceivers in a bit serial digital format;

wherein at least said second radio channel is a time division, multiple access radio channel characterized by a plurality of recurring frames, each of said frames comprising a plurality of equal length slots having a duration that is selected for enabling up to n bits of data to be transmitted to the base station from said transmitting means of a user transceiver;

wherein each user transceiver further comprises means for receiving a pre-assignment of an individual one of a plurality of first slots for conveying communications traffic information;

wherein said frame is comprised at least one second slot that is not pre-assigned to any of said plurality of user transceivers;

wherein said transmitting means of said plurality of user transceivers transmit a channel allocation request message to said base station during said at least one second slot, the transmitted channel allocation request message comprising up to m bits of data, where m<n;

and wherein said transmitting means of multiple ones of said user transceivers transmit a channel allocation request message during said at least one second slot, wherein said at least one second slot is divided into a plurality of sub-slots by a spreading code that is assigned to individual ones of user transceivers to transmit during said at least one second slot, each of said assigned spreading codes being one of mutually orthogonal and substantially orthogonal to other assigned spreading codes.

22. A radio communications system comprising:

at least one base station comprising means for transmitting information over a first radio channel and for receiving information over a second radio channel; and a plurality of user transceivers each comprising means for transmitting information over the second radio channel and for receiving information over the first radio channel, the information being transmitted by each of said plurality of user transceivers in a bit serial digital format;

wherein at least said second radio channel is a time division, multiple access radio channel characterized by a plurality of recurring frames, each of said frames comprising a plurality of equal length slots having a duration that is selected for enabling up to n bits of data to be transmitted to the base station from said transmitting means of a user transceiver;

wherein each user transceiver further comprises means for receiving a pre-assignment of an individual one of a plurality of first slots for conveying communications traffic information;

wherein said frame is comprised at least one second slot that is not pre-assigned to any of said plurality of user transceivers;

wherein said transmitting means of said plurality of user transceivers transmit a channel allocation request message to said base station during said at least one second slot, the transmitted channel allocation request message comprising up to m bits of data, where m<n;

and wherein said transmitting means of multiple ones of said user transceivers transmit a channel allocation request message during said at least one second slot, wherein said transmitting means of each of said user transceivers transmits a radio signal with a first bandwidth during an assigned one of said first time slots, and transmits a radio signal with a second bandwidth during said at least one second slot, and wherein said second bandwidth is narrower than said first bandwidth.

23. A radio communications system comprising:

at least one base station comprising means for transmitting information over a first radio channel and for receiving information over a second radio channel; and a plurality of user transceivers each comprising means for transmitting information over the second radio channel and for receiving information over the first radio channel, the information being transmitted by each of said plurality of user transceivers in a bit serial digital format;

wherein at least said second radio channel is a time division, multiple access radio channel characterized by a plurality of recurring frames, each of said frames comprising a plurality of equal length slots having a duration that is selected for enabling up to n bits of data to be transmitted to the base station from said transmitting means of a user transceiver;

wherein each user transceiver further comprises means for receiving a pre-assignment of an individual one of a plurality of first slots for conveying communications traffic information;

wherein said frame is comprised at least one second slot that is not pre-assigned to any of said plurality of user transceivers;

wherein said transmitting means of said plurality of user transceivers transmit a channel allocation request message to said base station during said at least one second slot, the transmitted channel allocation request message comprising up to m bits of data, where m<n; and wherein said transmitting means of multiple ones of said user transceivers transmit a channel allocation request message during said at least one second slot, wherein said base station is comprised of a receiver; an equalizer means having input coupled to an output of said receiver for equalizing a transmission received from a user transceiver during one of said plurality of first time slots; and a plurality of correlator means individual ones of which have an input coupled to said output of said receiver for simultaneously detecting a plurality of messages received from a plurality of user transceivers during said at least one second time slot.

24. A method for operating a radio communications system, comprising the steps of:

providing at least one central transceiver comprising means for transmitting information over a first radio channel and for receiving information over a second radio channel;

providing a plurality of user transceivers each comprising means for transmitting information over the second radio channel and for receiving information over the first radio channel, the information being transmitted by each of the plurality of user transceivers in a bit serial digital format;

partitioning at least said second radio channel into a plurality of recurring frames, each of the frames comprising a plurality of equal length slots having a duration that is selected for enabling up to n bits of data to be transmitted to the central transceiver from a user transceiver;

pre-assigning individual ones of a plurality of first slots to individual ones of the plurality of user transceivers for conveying communications traffic information;

simultaneously transmitting a plurality of messages to the central transceiver from individual ones of a plurality of the user transceivers during at least one second slot, the transmitted messages each comprising up to m bits of data, where m<n; and transmitting during a second slot an acknowledgement message to the central transceiver in response to one of a user transceiver receiving communications traffic information from the first radio channel and a user transceiver detecting an error that occurs while receiving communications traffic information from the first radio channel.

25. A radio communications system, comprising:

at least one central transceiver comprising means for transmitting information over a radio channel and for receiving information over the radio channel; and a plurality of user transceivers each comprising means for transmitting information over the radio channel and for receiving information over the radio channel, the information being transmitted by each of said plurality of user transceivers in a bit serial digital format;

wherein said transmitting means of at least said plurality of user transceivers utilize the radio channel for transmission as a time division, multiple access radio channel characterized by a plurality of recurring frames, each of said frames comprising a plurality of equal length slots having a duration that is selected for enabling up to n bits of data to be transmitted to the central transceiver from a user transceiver;

wherein each user transceiver further comprises means for receiving a pre-assignment of an individual one of a plurality of first slots for conveying communications traffic information;

wherein said transmitting means of said plurality of user transceivers transmit a message to said central transceiver during at least one second slot, the transmitted message comprising up to m bits of data, where m<n;

and wherein said transmitting means of multiple ones of said user transceivers transmit the message during said at least one second slot, wherein said messages are acknowledgement messages generated by a user transceiver and transmitted by said transmitting means in response to an error that occurs while receiving communications traffic information from said radio channel, and wherein said at least one second slot is temporally divided into a plurality of sub-slots.

* * * * *